United States Patent
Arihara

(10) Patent No.: US 10,415,635 B2
(45) Date of Patent: Sep. 17, 2019

(54) TILTING PAD JOURNAL BEARING

(71) Applicant: KOBE STEEL, LTD., Hyogo (JP)

(72) Inventor: Hirotoshi Arihara, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/072,118

(22) PCT Filed: Jan. 24, 2017

(86) PCT No.: PCT/JP2017/002277
§ 371 (c)(1),
(2) Date: Jul. 23, 2018

(87) PCT Pub. No.: WO2017/135101
PCT Pub. Date: Aug. 10, 2017

(65) Prior Publication Data
US 2019/0024707 A1    Jan. 24, 2019

(30) Foreign Application Priority Data

Feb. 2, 2016    (JP) .................................. 2016-018116

(51) Int. Cl.
| | |
|---|---|
| *F16C 17/02* | (2006.01) |
| *F16C 17/10* | (2006.01) |
| *F16C 37/00* | (2006.01) |
| *F16C 17/03* | (2006.01) |

(Continued)

(52) U.S. Cl.
CPC .............. *F16C 17/10* (2013.01); *F16C 17/03* (2013.01); *F16C 27/02* (2013.01); *F16C 33/108* (2013.01); *F16C 37/00* (2013.01); *F16C 37/007* (2013.01)

(58) Field of Classification Search
CPC ....... F16C 17/03; F16C 33/108; F16C 37/002
See application file for complete search history.

(56) References Cited

U.S. PATENT DOCUMENTS

| | | | | |
|---|---|---|---|---|
| 3,687,510 A | * | 8/1972 | Cooper | .................. F16C 17/03 384/311 |
| 5,288,153 A | * | 2/1994 | Gardner | .................. F16C 17/03 384/117 |

(Continued)

FOREIGN PATENT DOCUMENTS

| | | |
|---|---|---|
| JP | H09-032848 A | 2/1997 |
| JP | 2000-274432 A | 10/2000 |

(Continued)

OTHER PUBLICATIONS

International Search Report; issued in PCT/JP2017/002277; dated Apr. 25, 2017.

(Continued)

*Primary Examiner* — Thomas R Hannon
(74) *Attorney, Agent, or Firm* — Studebaker & Brackett PC

(57) ABSTRACT

A tilting pad journal bearing includes a bearing housing, a plurality of pads and a projecting portion. The plurality of pads are arranged on an inner circumferential surface of the bearing housing and support a rotary shaft. The projecting portion is provided on a surface of the pad and has a plurality of projections. The projecting portion is provided on a surface other than a pad bearing surface in surfaces of the pad, the pad bearing surface being a surface that faces the rotary shaft.

15 Claims, 11 Drawing Sheets

(51) Int. Cl.
  *F16C 27/02*  (2006.01)
  *F16C 33/10*  (2006.01)

(56) References Cited

U.S. PATENT DOCUMENTS

| | | | |
|---|---|---|---|
| 8,366,323 B2 * | 2/2013 | Waki | F16C 17/03 384/117 |
| 9,534,637 B2 * | 1/2017 | Livermore-Hardy | F16C 37/002 |
| 2015/0003762 A1 | 1/2015 | Sato et al. | |
| 2016/0115996 A1 | 4/2016 | Kammerer et al. | |

FOREIGN PATENT DOCUMENTS

| | | |
|---|---|---|
| JP | 2009-030704 A | 2/2009 |
| JP | 2010-216318 A | 9/2010 |
| JP | 2015-007463 A | 1/2015 |
| WO | 2014/184170 A1 | 11/2014 |

OTHER PUBLICATIONS

Written Opinion; issued in PCT/JP2017/002277; dated Apr. 25, 2017.

* cited by examiner

TILTING PAD JOURNAL BEARING

TECHNICAL FIELD

The present invention relates to a tilting pad journal bearing.

BACKGROUND ART

For example, Patent Document 1 describes a conventional tilting pad journal bearing. A tilting pad journal bearing is a bearing that is used in a rotary machine whose rotary shaft rotates at a high speed and that can inhibit unstable vibrations such as oil whip or oil swirl. The tilting pad journal bearing includes a plurality of pads that rotatably support a rotary shaft. The rotating rotary shaft sweeps a lubricant into a gap between pad bearing surfaces of the pads and the rotary shaft. When the temperature of the pads rises too high, the pads are burnt to be damaged, leading to a fear that the tilting pad journal bearing does not properly function as a bearing.

Patent Document 1 describes a technique for avoiding the increase in the temperature of the pads. In this technique, oil supply grooves are provided on the pad bearing surfaces. The increase in the temperature of the pad bearing surfaces is attempted to be inhibited by a low-temperature lubricant that is supplied from these oil supply grooves.

PRIOR ART DOCUMENT

Patent Document

Patent Document 1: JP-A-2009-30704

SUMMARY OF THE INVENTION

Technical Problems

In the technique of Patent Document 1, however, the following problem is caused by providing the oil supply grooves on the pad bearing surfaces. A pressure for supporting the rotary shaft is generated on the pad bearing surfaces. However, a flow path of the lubricant that flows in a rotating direction of the rotary shaft through the gap between the pad bearing surfaces and the rotary shaft expands quickly at portions where the oil supply grooves are provided, leading to generation of a negative pressure. Because of this, the pressure for supporting the rotary shaft is reduced, leading to a problem in that a capability to support the load of the rotary shaft (a load supporting capability) is reduced. Further, in the tilting pad journal bearing, a damping effect (a vibration inhibiting effect) is generated by an oil film in the gap between the pad bearing surfaces and the rotary shaft, however, the damping effect is not generated at the portions where the oil supply grooves are provided. Because of this, as compared with a pad having no oil supply groove, there is a problem that the damping effect is reduced.

Then, an object of the present invention is to provide a tilting pad journal bearing that can ensure the load supporting capability and the damping effect and can cool pads.

Solution to Problems

The tilting pad journal bearing in the present invention includes a bearing housing, a plurality of pads, and a projecting portion. The pads are arranged on an inner circumferential surface of the bearing housing and support a rotary shaft. The projecting portion is provided on a surface of the pad and has a plurality of projections. The projecting portion is provided on a surface other than a pad bearing surface in surfaces of the pad, the pad bearing surface being a surface that faces the rotary shaft.

Advantageous Effects of the Invention

Adopting the configuration described above can ensure the load supporting capability and the damping effect and can cool the pads.

DESCRIPTION OF EMBODIMENTS

First Embodiment

Figure 1:
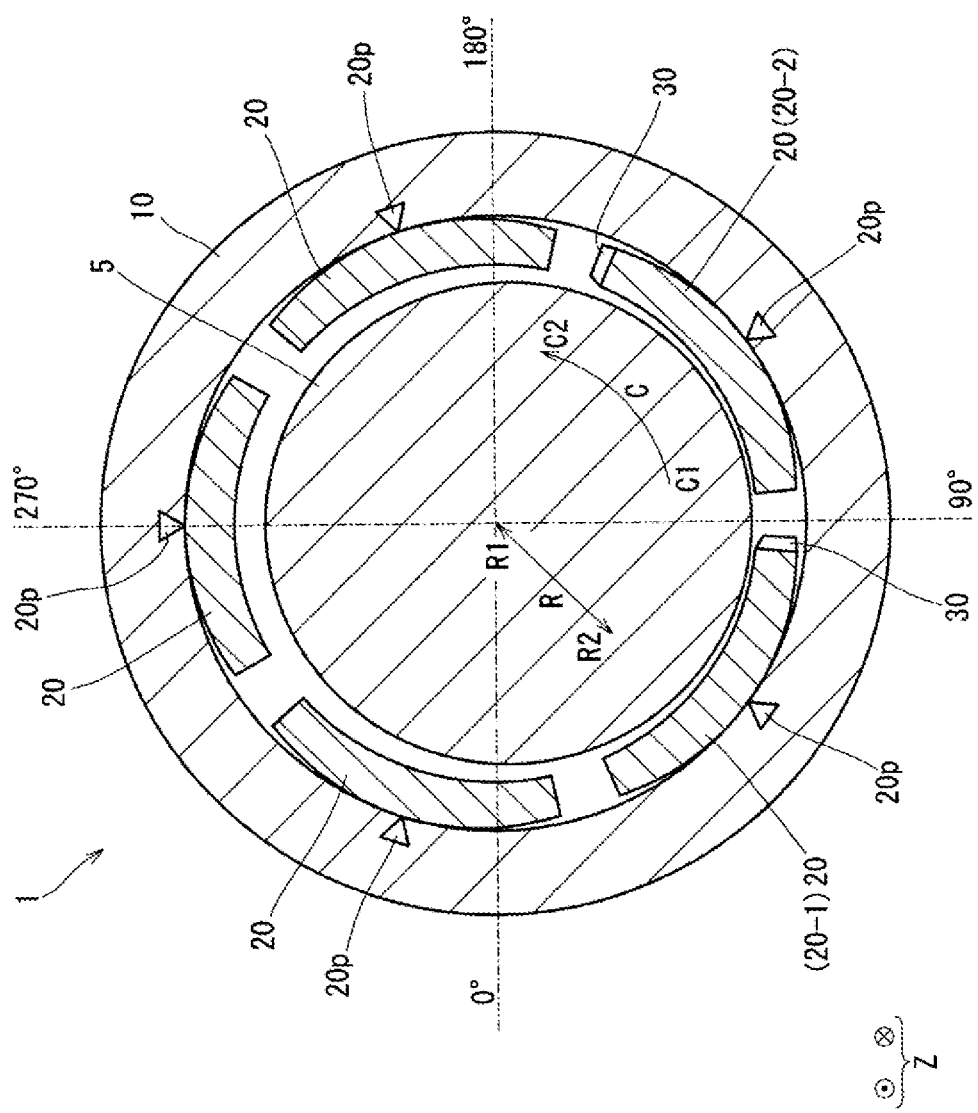
FIG. 1 is a sectional view of a tilting pad bearing 1 as seen from an axial direction Z.

Referring to FIG. 1 to FIG. 4, a tilting pad bearing 1 (a tilting pad journal bearing) in the first embodiment is described.

A tilting pad bearing 1 (a tilting pad bearing with cooling fins) is a bearing that rotatably supports a rotary shaft 5 of a rotary machine. The tilting pad bearing 1 includes a bearing housing 10, a pad 20 and a fin portion 30 (a projecting portion). The rotary machine having the rotary shaft 5 is, for example, a compressor for compressing a fluid, a pump or blower for sending a fluid under pressure, and a turbine for expanding a fluid. Hereinafter, an axial direction Z, a radial direction R (a radially inner side R1, a radially outer side R2) and a rotation direction C (an upstream side C1 in the rotation direction and a downstream side C2 in the rotation direction) are described on the basis of a center axis of the rotary shaft 5.

The bearing housing 10 is a cylindrical member that covers the rotary shaft 5, the pad 20 and the like. The bearing housing 10 includes an oil supply port 11 shown in FIG. 3. The oil supply port 11 is an oil supply means for supplying a lubricant into the bearing housing 10. The lubricant is used to lubricate and cool the tilting pad bearing 1. The oil supply port 11 is a hole formed in an inner circumferential surface of the bearing housing 10. The oil supply port 11 is directed towards the radially inner side R1. The direction of the oil supply port 11 is a direction of a center axis of the oil supply port 11 at an exit of the oil supply port 11 and a direction of a flow F of the lubricant that is jetted from the oil supply port 11. The oil supply port 11 is directed towards an inter-pad space S2 between an upstream-side pad 20A and a downstream-side pad 20B. The exit of the oil supply port 11 has, for example, a circular shape when seen from the radial direction R.

Figure 3:
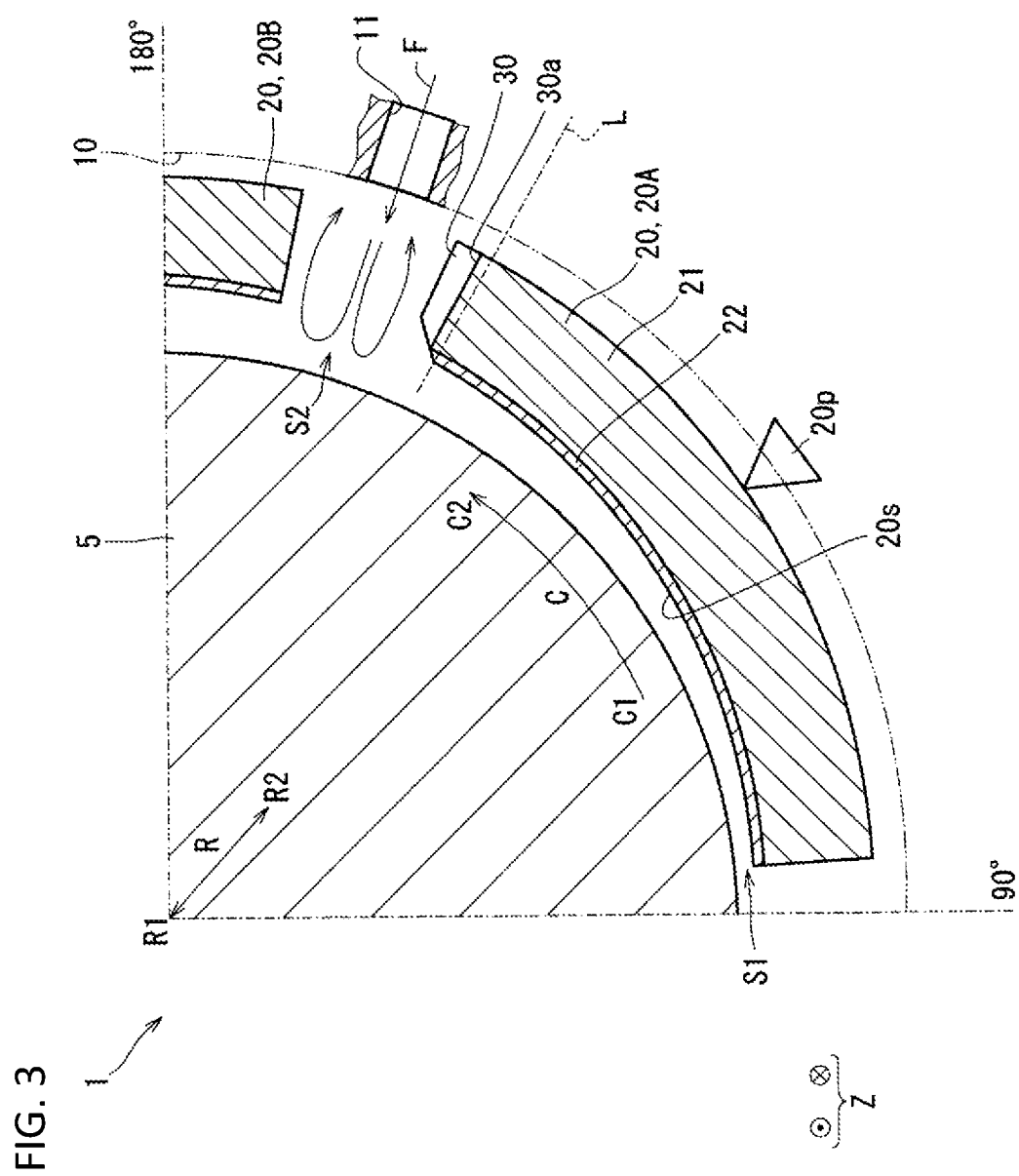
FIG. 3 is a view of pads 20 and the like that are shown in FIG. 1 as seen from the axial direction Z.

As shown in FIG. 1, the pad 20 (the bearing pad) is a substantially plate-shaped member that supports the rotary shaft 5. As the pad 20, a plurality of pads is provided, and in this embodiment, for example, five pads are provided. The plurality of pads 20 are arranged on the inner circumferential surface of the bearing housing 10 so as to be aligned around the rotary shaft 5 along the rotation direction C. The pads 20 contact the inner circumferential surface of the bearing housing 10 at fulcrums 20p that are shown schematically in FIG. 1 and FIG. 3. The pads 20 shown in FIG. 1 can oscillate about fulcrums 20p in a section perpendicular to the axial direction Z. Each pad 20 tilts at an optimum angle to the bearing housing 10 depending on the magnitude of a load exerted on each pad 20. As shown in FIG. 3, in surfaces of the pad 20, a surface that faces the rotary shaft 5 is referred to as a pad bearing surface 20s. The pad bearing surface 20s touches the rotary shaft 5 via the lubricant. The pad 20 includes a base metal 21 and a white metal 22. The base metal 21 has a thickness of, for example, several tens of millimeters and has a relatively high heat conductivity among general metals. The while metal 22 is coating on a radially inner side R1 surface of the base metal 21 and makes up the pad bearing surface 20s. The white metal 22 has a thickness of, for example, several millimeters, is relatively soft among general metals and has good conformability. It should be noted that the white metal 22 may be replaced by other metals than the white metal 22.

(Temperature Increase in Pad 20 or the Like)

Figure 2:
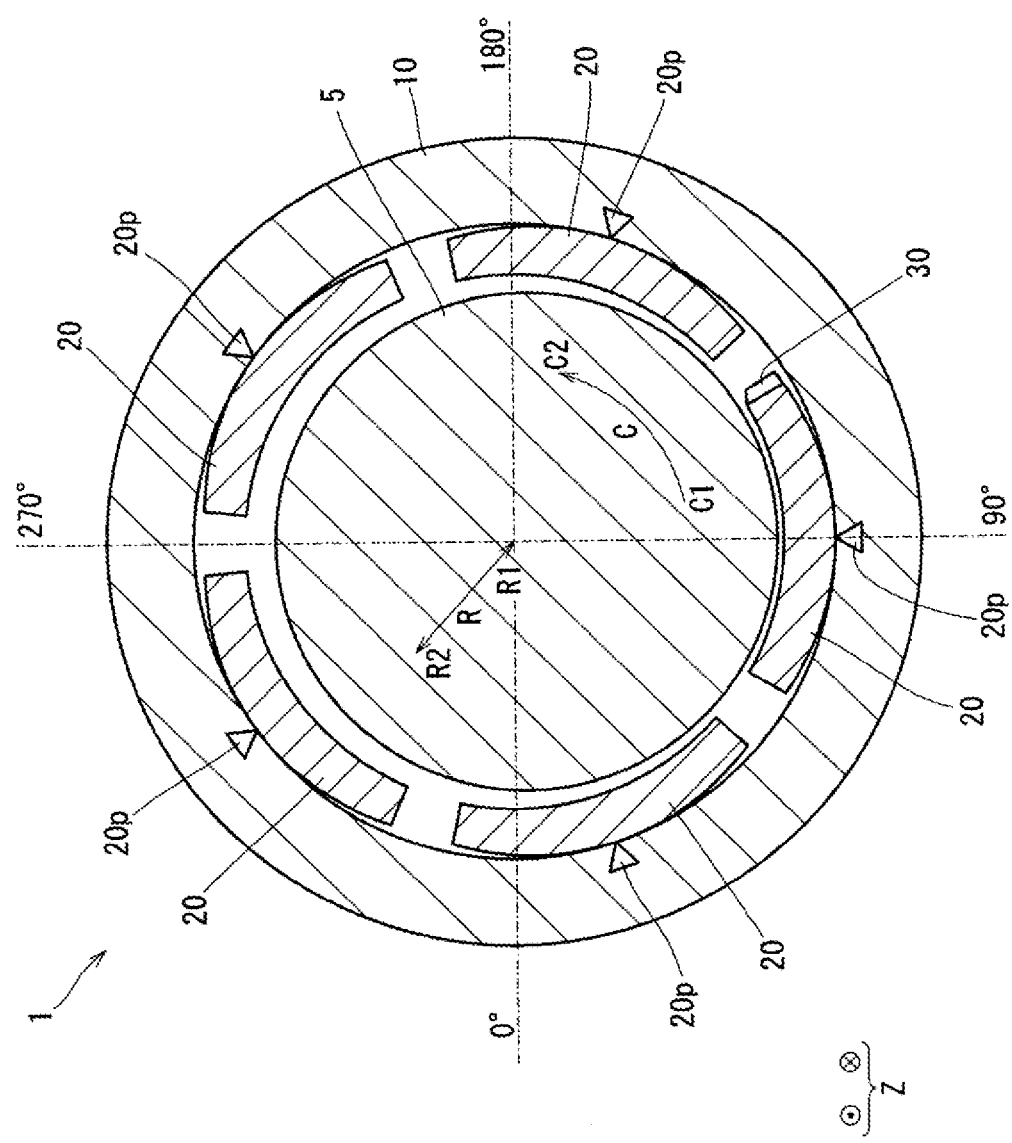
FIG. 2 is a view of the tilting pad bearing 1 in a modified example (LOP), corresponding to FIG. 1.

In general, there are two ways of arranging the pads 20. As shown in FIG. 1, a method of arranging pads 20 so that an operating line of a bearing load exerted on the tilting pad bearing 1 from the rotary shaft 5 (refer to "90°" in FIG. 1) passes between two pads 20 is called Load Between Pads (hereinafter, referred to as LBP). In the LBP, pads 20 disposed adjacent to each other across the operating line bear a greater load than a load that the other pads 20 bear. As shown in FIG. 2, a method of arranging pads 20 so that a bearing load exerted on the tilting pad hearing 1 from the rotary shaft 5 is exerted on one pad 20 is called Load On Pad (hereinafter, referred to as LOP). In the LOP, a pad 20 through which the operating line passes bears a greater load than a load that the other pads 20 bear. In the pad 20 that bears the greater load than the load that the other pads 20 bear, the temperature of the relevant pad 20 is increased to a high level due to heat generated by an increase in the viscosity of the lubricant. The bearing load exerted on the tilting pad bearing 1 from the rotary shaft 5 is a total force of a weight of the rotary shaft 5 itself and a force exerted on the pad 20 via the rotary shaft 5 from a gear and the like coupled to the rotary shaft 5.

As shown in FIG. 3, a gap S1 exits between the pad bearing surfaces 20s of the pads 20 and the rotary shaft 5. A lubricant flows into the gap S1 to form an oil film. When the rotary shaft 5 rotates, the lubricant is swept into the gap S1 towards the downstream side C2 in the rotation direction, and this generates a wedge effect of lifting up the rotary shaft 5 relative to the pads 20. In this case, the lubricant flows towards the downstream side C2 in the rotation direction through the gap S1. The temperature of the lubricant is increased due to viscous friction generated by the lubricant flowing. Because of this, the temperature of the lubricant in the gap S1 between one pad 20 and the rotary shaft 5 is higher towards the downstream side C2 in the rotation direction. As a result, a temperature of the pad bearing surface 20s of the relevant pad 20 also becomes higher towards the downstream side C2 in the rotation direction. Additionally, a temperature at an end portion of the pad 20 at the downstream side C2 in the rotation direction is higher towards a center of the pad 20 in the axial direction Z. When the temperature of the pad bearing surface 20s is too high, there is a fear that the pad 20 is burnt to be damaged. In particular, in the case of the white metal 22 being used as the pad bearing surface 20s, the white metal 22 has a low melting point (lower than that of the base metal 21), and therefore, the pad 20 tends to be burnt to be damaged easily. When the pad 20 burns to be damaged, there is a fear that the tilting pad bearing 1 does not properly function as a bearing. Because of this, there is a fear that a malfunction of the tilting pad bearing 1 leads to a failure of a machine including the tilting pad bearing 1. Because of this, it is important to inhibit an increase in the temperature of the pad bearing surface 20s by cooling the pad bearing surface 20s by cooling the pad 20. It is preferable to cool particularly the end portion of the pad 20 that bears the bearing load from the rotary shaft 5, at the downstream side C2 in the rotation direction of the pad 20, in the plurality of pads 20 shown in FIG. 1, and the cooling of the pad 20 in that way is effective to inhibit an increase in the temperature of the pad 20.

The fin portion 30 (the projecting portion) is a portion for cooling the pad 20 by expanding a heat transfer area between the pad 20 and the lubricant. The fin portion 30 is provided on at least the pad 20 in the plurality of pads 20 that bears the bearing load from the rotary shaft 5. In the case of LBP, the fin portion 30 is provided on at least the pads 20 that are disposed adjacent to each other across the operating line of the bearing load (the pad 20 on the upstream side C1 in the rotation direction and the pad 20 on the downstream side C2 in the rotation direction). In the case of the LOP shown in FIG. 2, the fin portion 30 is provided on at least the pad 20 through which the operating line of the bearing load passes. As shown in FIG. 3, the fin portion 30 is provided on a surface of the pad 20. In the surfaces of the pad 20, the fin portion 30 is provided on a surface of the pad 20 other than the pad bearing surface 20s.

It is preferable that the fin portion 30 is provided as follows. The fin portion 30 is provided so that a performance that a conventional pad including no fin portion 30 has as a bearing can be ensured. To be more specific, the fin portion 30 is provided so as to ensure a supporting force with which the rotary shaft 5 is supported, a required rigidity of the pad 20 and a damping property (a vibration inhibiting effect) by the tilting pad bearing 1. The fin portion 30 is provided so that the pad bearing surface 20s can have a pressure bearing area that is required to support the rotary shaft 5. For example, there may be a case where the supporting force and the rigidity cannot be ensured in the case where the fin portion 30 is formed by digging a groove in a surface of a conventional pad. Then, the fin portion 30 is provided, for example, by adding the fin portion 30 to an outer side of the conventional pad.

Figure 4:
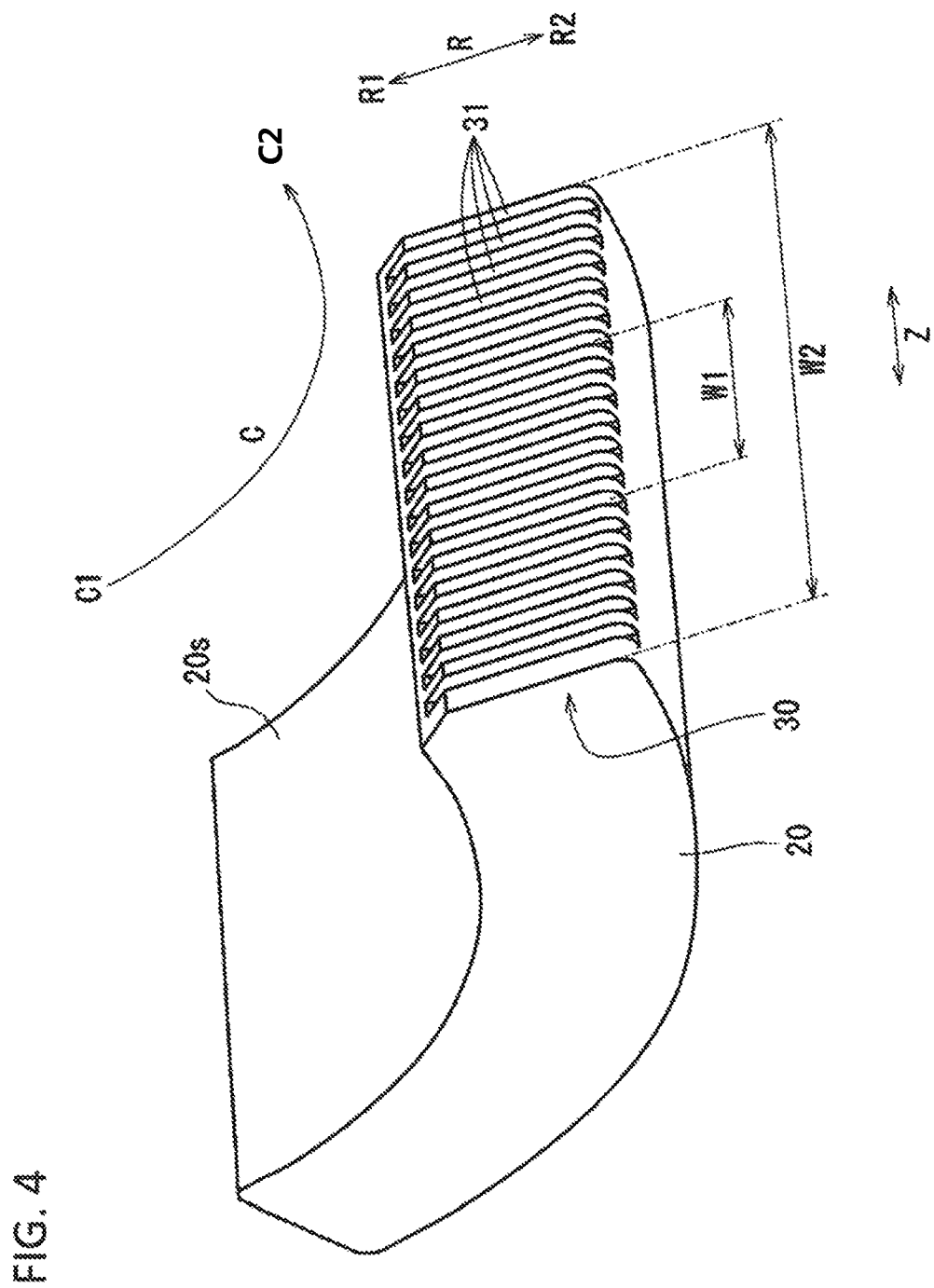
FIG. 4 is a perspective view of the pad 20 and the like that are shown in FIG. 3.

It is preferable that the fin portion 30 is provided on a surface portion where the temperature of the pad 20 is high in the surfaces of the pad 20. More specifically, the fin portion 30 is provided on a surface of the end portion of the pad 20 at the downstream side C2 in the rotation direction. To enable heat to be dissipated effectively, the fin portion 30 is provided on a portion made up of the base metal 21 having higher heat conductivity than the white metal 22. As shown in FIG. 4, the fin portion 30 is provided on at least a central portion of the pad 20 in a width direction thereof. The width direction of the pad 20 is equal to an axial direction Z thereof. A width W1 of the "central portion of the pad 20 in the width direction thereof" is one third of an overall width W2 of the pad 20. The fin portion 30 is provided over the whole surface (along the overall width) which extends from one end to the other end in the width direction of the pad 20.

Figure 10:
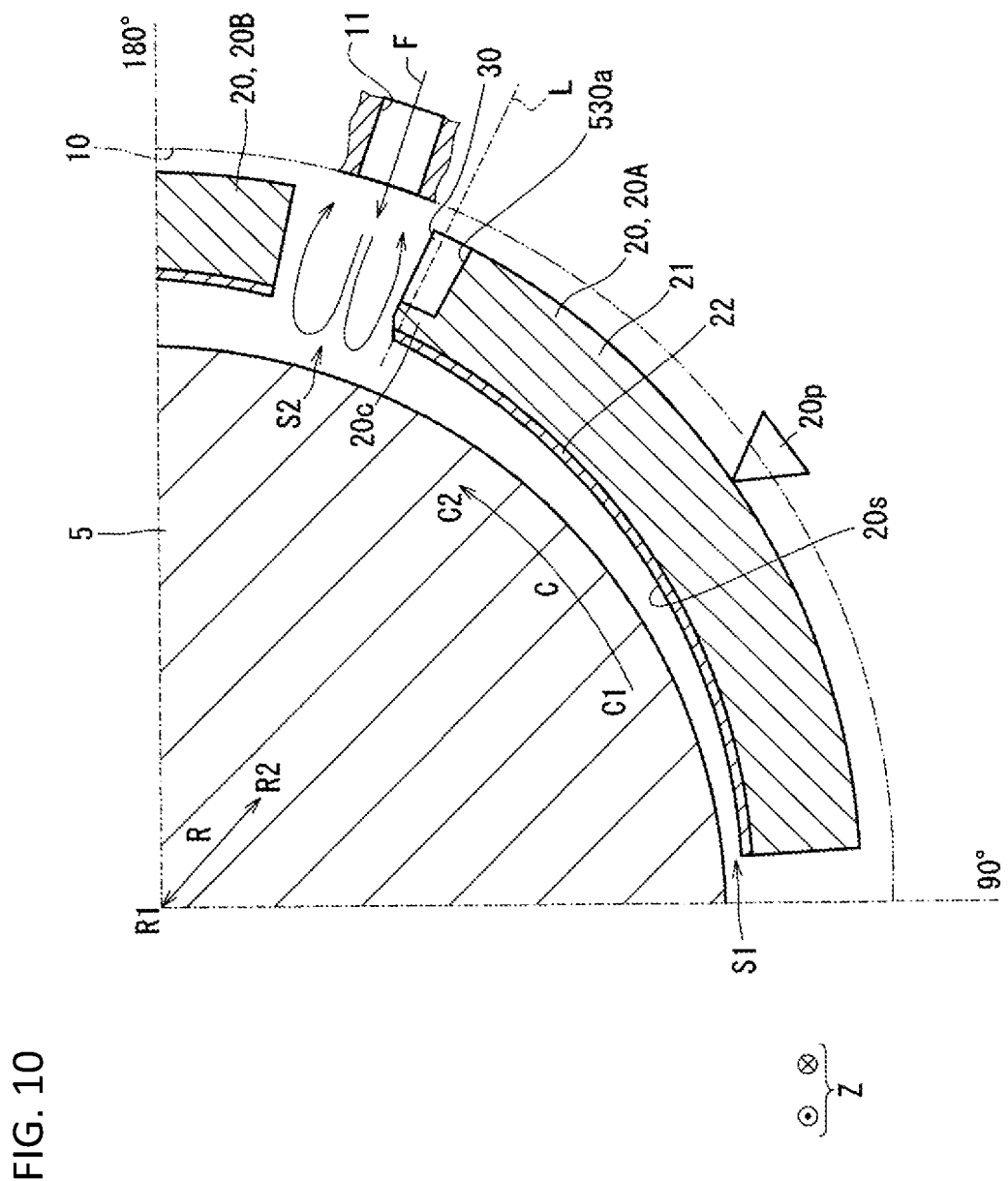
FIG. 10 is a drawing corresponding to FIG. 3 that shows a modified example.

It is desirable that the fin portion 30 is provided so that a heat capacity of a portion of the pad 20 that lies towards the radially outer side R2 from the pad bearing surface 20s shown in FIG. 3 is not reduced. For example, as shown in FIG. 10, the following case is considered: a fin portion 30 is formed by digging (hollowing out, gouging) a groove at a portion of the pad 20 that lies towards the radially outer side R2 from a pad bearing surface 20s of a conventional pad. Then, a volume of the pad 20 at the portion lying towards the radially outer side R2 from the pad bearing surface 20s is reduced, whereby a thin portion 20c is formed between the fin portion 30 and the pad bearing surface 20s. Then, there may be a case where the temperature of the pad 20 is increased due to thermal saturation resulting from a small heat capacity of the thin portion 20c as compared with the case where no fin portion 30 is provided. To cope with this, as shown in FIG. 3, the fin portion 30 is provided towards the downstream side C2 in the rotation direction from the pad bearing surface 20s. When seen from the axial direction Z, a bottom portion 30a of the fin portion 30 resides within an area including an imaginary line L that extends from an end of the pad bearing surface 20s that lies at the downstream side C2 in the rotation direction towards the radially outer side R2 along the radial direction R and a portion lying towards the downstream side C2 in the rotation direction from the imaginary line L. For example, the bottom portion 30a is disposed so as to follow a surface of the conventional pad. A section of the bottom portion 30a as seen from the axial direction Z has a shape of a straight line.

This fin portion 30 is provided only on the surface of the end portion of the pad 20 in the rotation direction C (in this embodiment, on the surface of the end portion at the downstream side C2 in the rotation direction). In this case, the tilting pad bearing 1 of this embodiment can be used in place of a conventional tilting pad bearing without changing a diameter of a bearing housing 10 thereof. Thus, the conventional tilting pad bearing can be replaced by the tilting pad bearing 1 of the present invention easily. As a result, a machine in which the tilting pad bearing 1 is provided does not have to be modified.

It is desirable that a height of the fin portion 30 is set as follows. The "height of the fin portion 30" means a dimension from the bottom portion 30a to a surface of the fin portion 30 at the downstream side C2 in the rotation direction. One pad 20 on which the fin portion 30 is provided is referred to as an upstream-side pad 20A, and a pad that is situated next to (adjacent to) the upstream-side pad 20A towards the downstream side C2 in the rotation direction is referred to as a downstream-side pad 20B. A space between the upstream-side pad 20A and the downstream-side pad 20B is referred to as an inter-pad space S2. In this configuration, the height of the fin portion 30 is set so that a lubricant convects easily in the inter-pad space S2. More specifically, the height of the fin portion 30 is equal to or smaller than one fifth of a space (a shortest distance) between the upstream-side pad 20A and the downstream-side pad 20B in the rotation direction C. It is preferable that the height of the fin portion 30 is equal to or smaller than one tenth of the space from the standpoint of facilitating heat transfer between the fin portion 30 and the lubricant.

An end portion of the fin portion 30 that lies at the upstream side C1 in the rotation direction and the radially inner side R1 and an end portion of the white metal 22 that lies at the downstream side C2 in the rotation direction are chamfered to provide a continuous chamfered portion. Providing the chamfered portion can avoid the pad 20 and fin portion 30 from being damaged. The fin portion 30 has a plurality of fins 31 (projections) that are disposed parallel to one another. In FIG. 4, reference numeral is given to only a part of the plurality of fins 31 (this is also applied to the cases in FIG. 6 and FIG. 8).

The fins 31 are disposed so that a lubricant can flow through gaps between the fins 31. A better lubricating effect can be obtained as the number of fins 31 is greater. A thickness of the fin 31 is, for example, about 1 mm. An interval between the fins 31 is, for example, about 1 mm. The plurality of fins 31 each extend in the radial direction R and the rotation direction C (extend in a direction perpendicular to the axial direction Z). The gaps between the plurality of fins 31 penetrate the fin portion 30 in the radial direction R.

(Flow of Lubricant)

A lubricant is supplied to the tilting pad bearing 1 shown in FIG. 3 from an oil pump (not shown) that is situated outside the tilting pad bearing 1. A lubricant passes through the oil supply port 11 and is supplied into the inter-pad space S2. The lubricant oil whose temperature is low convects in the inter-pad space S2, thereby heat of the pad 20 whose temperature is high is transferred to the lubricant by way of the fin portion 30. As a result, the temperature of the pad 20 is reduced. The lubricant whose temperature is increased as a result of the heat of the pad 20 being transferred by way of the fin portion 30 passes through the gap between the rotary shaft 5 and the downstream-side pad 20B and is then discharged to the outside of the tilting pad bearing 1. Since the fins 31 (refer to FIG. 4) extends in the direction perpendicular to the axial direction Z, the lubricant in the gaps between the fins 31 tends to flow in the radial direction R and the rotation direction C easily. This tends to allow the lubricant to convect easily in the inter-pad space S2. This then allows the lubricant to easily flow towards the downstream-side pad 20B from the inter-pad space S2.

(Advantage of the First Invention)

An advantage provided by the tilting pad bearing 1 shown in FIG. 1 is as follows. The tilting pad bearing 1 includes the bearing housing 10, the plurality of pads 20, and the fin portion 30. The pads 20 are arranged on the inner circumferential surface of the bearing housing 10 and support the rotary shaft 5.

[Configuration 1-1] The fin portion 30 is provided on the surface of the pad 20 and has the plurality of fins 31 (refer to FIG. 4).

[Configuration 1-2] As shown in FIG. 3, the fin portion 30 is provided on a surface other than the pad bearing surface 20s in the surfaces of the pad 20, the pad bearing surface 20s being a surface facing the rotary shaft 5.

By adopting the above [Configuration 1-1], the heat of the pad 20 can be transferred to the lubricant by way of the plurality of fins 31 (refer to FIG. 4). Thus, the pad 20 can be prevented from being damaged through burning as a result of the pad 20 being able to be cooled. Further, the tilting pad bearing 1 includes the above [Configuration 1-2]. Thus, the capability of supporting the load of the rotary shaft 5 (the load supporting capability) by the pad bearing surface 20s is not reduced by the fin portion 30. Additionally, by adopting the above [Configuration 1-2], an oil film of a lubricant is formed in the gap S1 between the pad bearing surface 20s and the rotary shaft 5. Thus, a damping effect provided by the oil film formed in the gap S1 is not reduced by the fin portion 30. Consequently, in the tilting pad bearing 1, the pad 20 can be cooled while maintaining the load supporting capability and the damping effect. As a result, it is possible to improve the reliability of a machine including the tilting pad bearing 1.

(Advantage of the Second Invention)

[Configuration 2] The fin portion 30 is provided on the surface of the end portion of the pad 20 at the downstream side C2 in the rotation direction.

In the above [Configuration 2], the fin portion 30 is provided, in the surfaces of the pad 20, on the surface of the end portion thereof at the downstream side C2 in the rotation direction where the temperature is higher than those of the other surfaces of the pad 20. Thus, the pad 20 can be cooled more than the case where the fin portion 30 is provided on the other surfaces.

(Advantage of the Third Invention)

[Configuration 3] When seen from the axial direction Z, the bottom portion 30a of the fin portion 30 resides within the area that includes the imaginary line L that extends from the end of the pad bearing surface 20s at the downstream side C2 in the rotation direction to the radially outer side R2 along the radial direction R and the portion that is situated towards the downstream side C2 in the rotation direction from the imaginary line L.

In the above [Configuration 3], the heat capacity of the portion of the pad 20 that is situated towards the radially outer side R2 from the pad bearing surface 20s is greater than the case where the bottom portion 30a is situated towards the upstream side C1 in the rotation direction from the imaginary line L. In greater detail, the pad 20 has no thin portion 20c as shown in FIG. 10. Thus, it is possible to inhibit an increase in the temperature of the pad 20 shown in FIG. 3, and therefore, the pad 20 can be cooled more.

(Advantage of the 10$^{th}$ Invention)

The fin portion 30 is provided on the surface of the end portion of the pad 20 at the downstream side C2 in the rotation direction. The pad 20 where the fin portion 30 is provided is referred to as the upstream-side pad 20A, and the pad 20 that is disposed next to the upstream-side pad 20A towards the downstream side C2 in the rotation direction is referred to as the downstream-side pad 20B.

[Configuration 10] The height of the fin portion 30 that is defined from the bottom portion 30a to the surface of the fin portion 30 at the downstream side C2 in the rotation direction is equal to or smaller than one fifth of the space between the upstream-side pad 20A and the downstream-side pad 20B.

By adopting the above [Configuration 10], the lubricant is easily allowed to convect in the inter-pad space S2 between the upstream-side pad 20A and the downstream-side pad 20B, as compared with the case where the height of the fin portion 30 is too high. Thus, the heat is easily transferred from the fin portion 30 to the lubricant, and the lubricant is easily supplied from the inter-pad space S2 towards the downstream-side pad 20B. Thus, the pad 20 can be cooled more.

(Advantage of the 11$^{th}$ Invention)

[Configuration 11] As shown in FIG. 4, the fin portion 30 (the projecting portion) has the plurality of fins 31 that are disposed parallel to one another.

By adopting the above [Configuration 11], the lubricant is easy to flow the gaps between the fins 31, as compared with the case where a projecting portions are provided not parallel to one another. Thus, the heat is easy to be transferred from the fin portion 30 to the lubricant. Thus, the pad 20 can be cooled more.

(Advantage of the 12$^{th}$ Invention)

[Configuration 12] The plurality of fins 31 each extend in the radial direction R and the rotation direction C and are aligned in the axial direction Z.

In the above [Configuration 12], as shown in FIG. 3, the lubricant is easy to flow in the radial direction R and the rotation direction C. Thus, the lubricant flows in the radial direction R along the fins 31 that extend in the radial direction R (refer to FIG. 4, hereinafter, this is applied to the fins 31), whereby the heat is easy to be transferred from the fin portion 30 to the lubricant. Additionally, the lubricant flows in the rotation direction C along the fins 31 that extend in the rotation direction C, whereby the lubricant is easy to be supplied to the downstream-side pad 20B. Thus, the pad 20 can be cooled more.

(Advantage of the 13$^{th}$ Invention)

The bearing housing 10 includes the oil supply port 11 for supplying a lubricant into the bearing housing 10. [Configuration 13] The plurality of fins 31 each extend parallel to the supply direction of the lubricant from the oil supply port 11.

By adopting the above [Configuration 13], the lubricant is easy to flow through the gaps between the fins 31. Thus, the heat is easy to be transferred from the fin portion 30 to the lubricant. Thus, the pad 20 can be cooled more.

Second Embodiment

Figure 5:
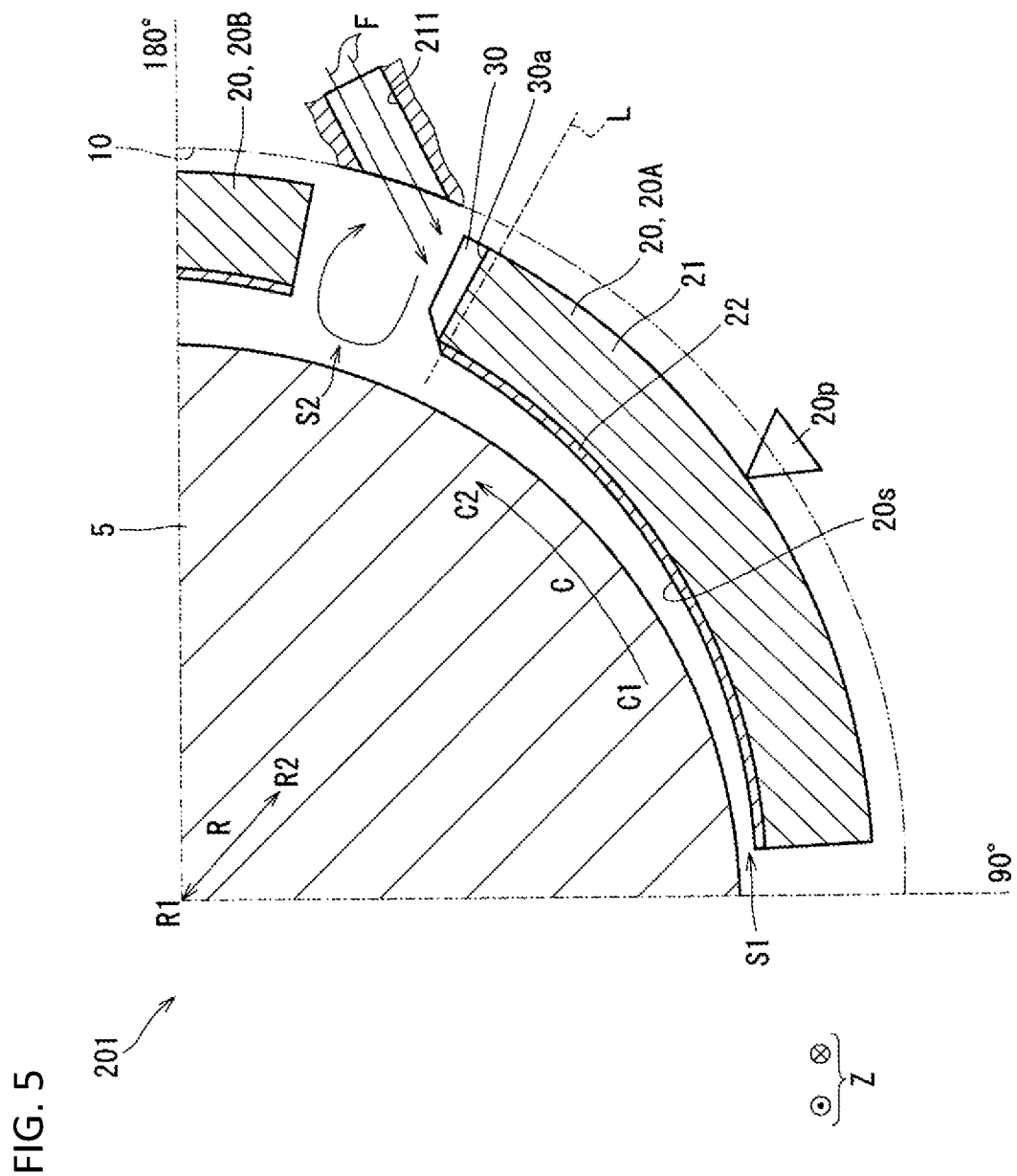
FIG. 5 is a drawing correspond ng to FIG. 3 that shows a second embodiment.
Figure 6:
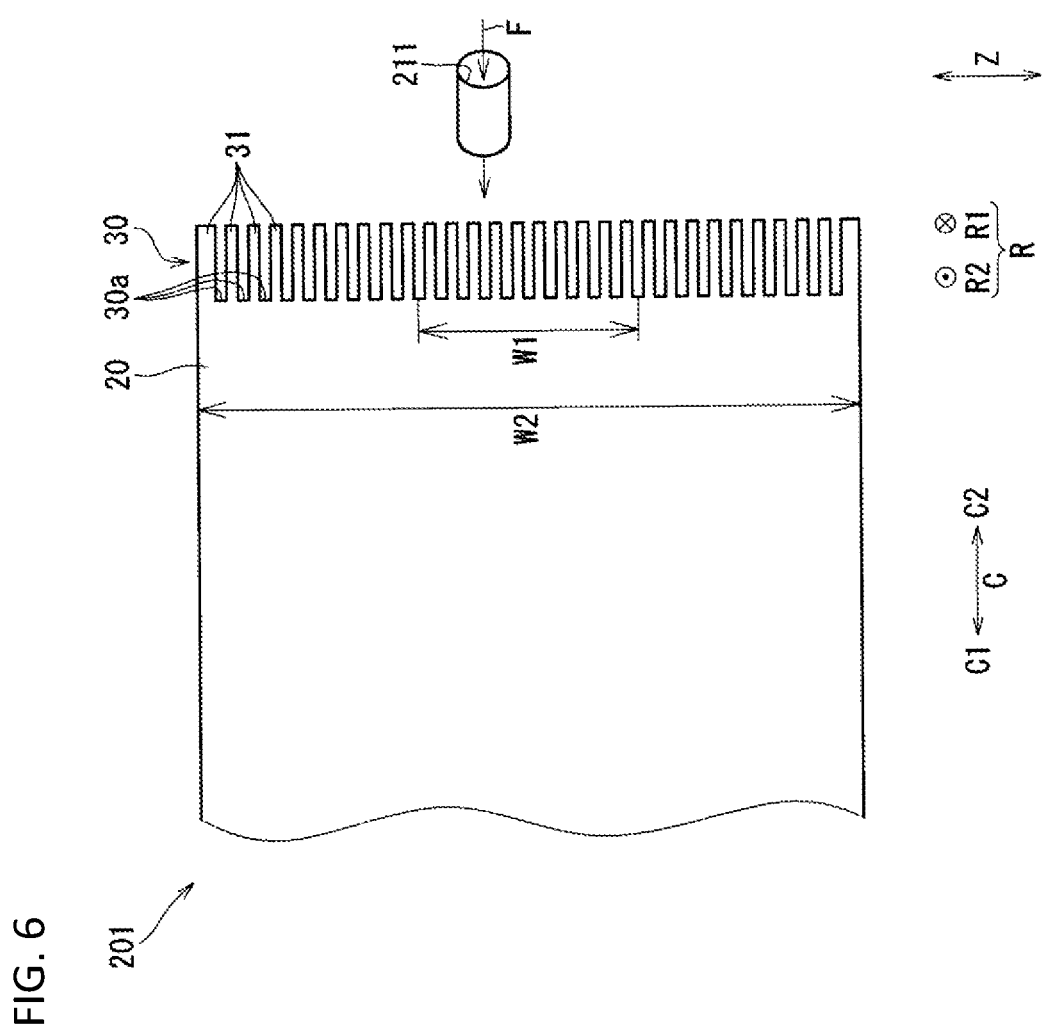
FIG. 6 is a schematic view of a pad 20 and the like that are shown in FIG. 5 as seen from a radially outer side R2.
Figure 7:
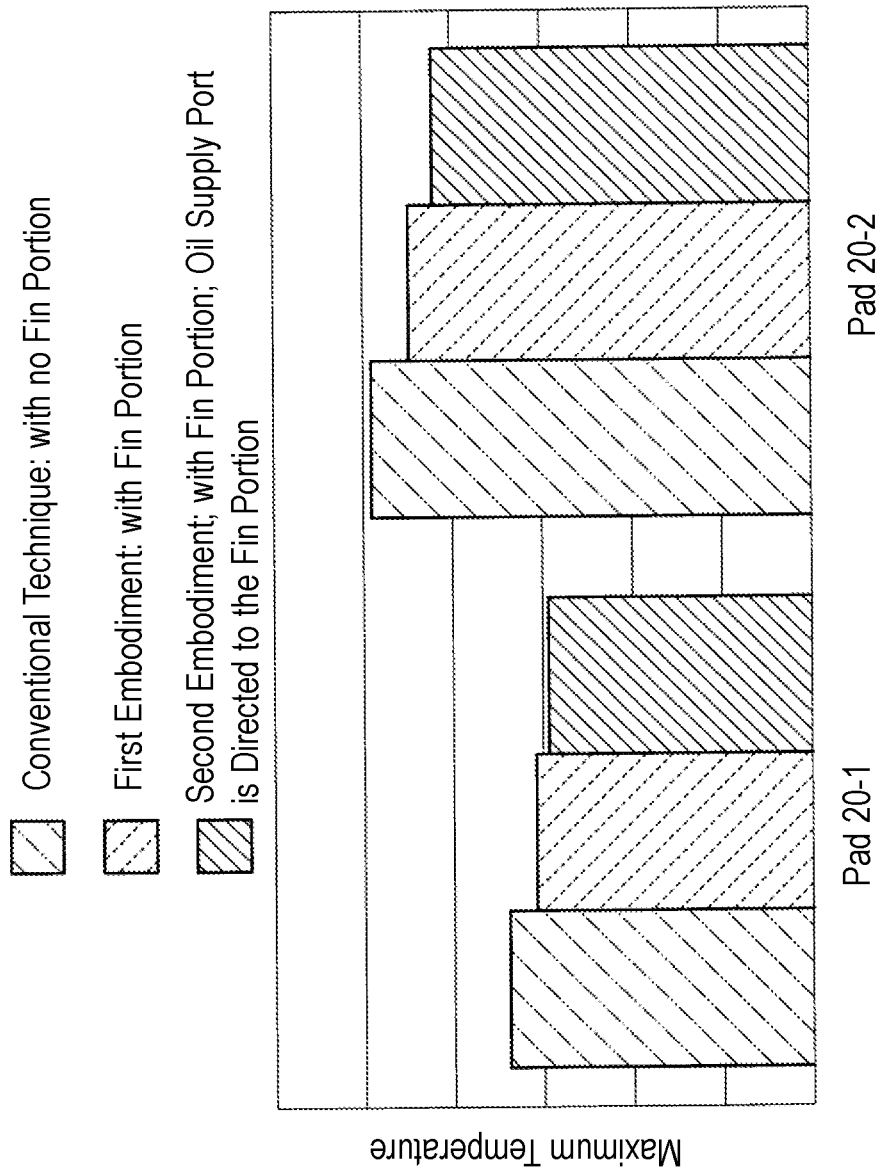
FIG. 7 is a graph showing maximum temperatures of pads 20.

Referring to FIG. 5 to FIG. 7, a tilting pad bearing 201 in the second embodiment is described in relation to a different feature from the first embodiment. In the tilting pad bearing 201 in the second embodiment, the reference numerals same as those of the first embodiment are given to the same features in the second embodiment, and a description thereof is omitted (omitting a description of the same features is also applied to other embodiments). A different feature is a direction of an oil supply port 211 as shown in FIG. 5.

The oil supply port 211 is configured as follows. As shown in FIG. 3, the oil supply port 11 in the first embodiment is directed towards the radially inner side R1. On the other hand, as shown in FIG. 5, the oil supply port 211 in the second embodiment is directed towards a fin portion 30. The oil supply port 211 is inclined with respect to a radial direction R so as to be directed towards an upstream side C1 in a rotation direction and the radially inner side R1. Here, the oil supply port 211 is inclined, for example, at about 45 degrees with respect to a radial direction R. Here, a temperature distribution of a pad 20 shown in FIG. 6 is such that the temperature increases from both end portions of the pad 20 in a width direction thereof towards a central portion of the pad 20 in the width direction (a central portion in an axial direction Z). Then, the oil supply port 211 is directed towards the fin portion 30 that is provided at the central portion of the pad 20 in the width direction thereof. Thus, the lubricant whose temperature is low can be injected directly to the portions of the pad 20 and the fin portion 30 whose temperatures are high, and this increases the effect of cooling the pad 20. As a result, an amount of the lubricant that is required to reduce the temperature of the pad 20 can be reduced. As a result, a volumetric capacity of the oil pump, which is expensive, does not have to be increased. Additionally, a diameter of an oil supply pipe that connects to the oil supply port 211 does not have to be enlarged. The temperatures at both the end portions (a range excluding the width W1 among the overall width W2 in FIG. 6) of the pad 20 in the width direction thereof are also increased, and the end portions of the pad 20 in the width direction thereof can be cooled by the lubricant. Thus, it is preferable that the lubricant is injected also to the end portion of the pad 20 in the width direction (as is described below).

The following three types of tilting pad bearings were compared with one another in relation to maximum temperatures of pads 20 thereof.

Conventional Technique: represented by the conventional tilting pad bearing that does not include the fin portion 30 shown in FIG. 3 but includes an oil supply port 11 that is similar to that of the first embodiment.

First Embodiment: represented by the tilting pad bearing 1 that includes the fin portion 30 and the oil supply port 11 that is directed towards the radially inner side R1.

Second Embodiment: represented by the tilting pad bearing 201 shown in FIG. 5 that includes the fin portion 30 and the oil supply port 211 that is directed towards the fin portion 30.

FIG. 7 shows the graph showing the results of the comparisons. FIG. 7 shows respective maximum temperatures of the two pads 20 (the pad 20-1 and the pad 20-2) that bear the bearing load in the LBP shown in FIG. 1. As shown in the graph, the maximum temperatures of the pads 20 according to the first and second embodiments where the fin portion 30 is provided are reduced as compared with the conventional technique where the fin portion 30 (refer to FIG. 3) is not provided. In addition, the maximum temperatures of the pads 20 are much reduced in the second embodiment as compared with the first embodiment by directing the oil supply port 211 towards the fin portion 30 as shown in FIG. 5.

(Advantage of the Fourth Invention)

An advantage of the tilting pad bearing 201 shown in FIG. 5 is as follows. The bearing housing 10 includes the oil supply port 211 for supplying a lubricant into the bearing housing 10.

[Configuration 4] The oil supply port 211 is directed towards the fin portion 30.

By adopting the above [Configuration 4], the lubricant whose temperature is lower than that of the lubricant that has passed through the gap S1 is allowed to touch the fin portion 30 from the oil supply port 211. Thus, since the fin portion 30 can be cooled more, the pad 20 can be cooled more accordingly.

(Advantage of the Fifth Invention)

[Configuration 5] A width direction of the pad 20 shown in FIG. 6 is equal to the axial direction Z. The oil supply port 211 is directed towards the fin portion 30 that is provided at the central portion of the pad 20 in the width direction thereof.

By adopting the above [Configuration 5], the oil supply port 211 can inject the lubricant towards the portions of the pad 20 and the fin portion 30 whose temperatures are high. Thus, since the fin portion 30 can be cooled more, the pad 20 can be cooled more accordingly.

Third Embodiment

Figure 8:
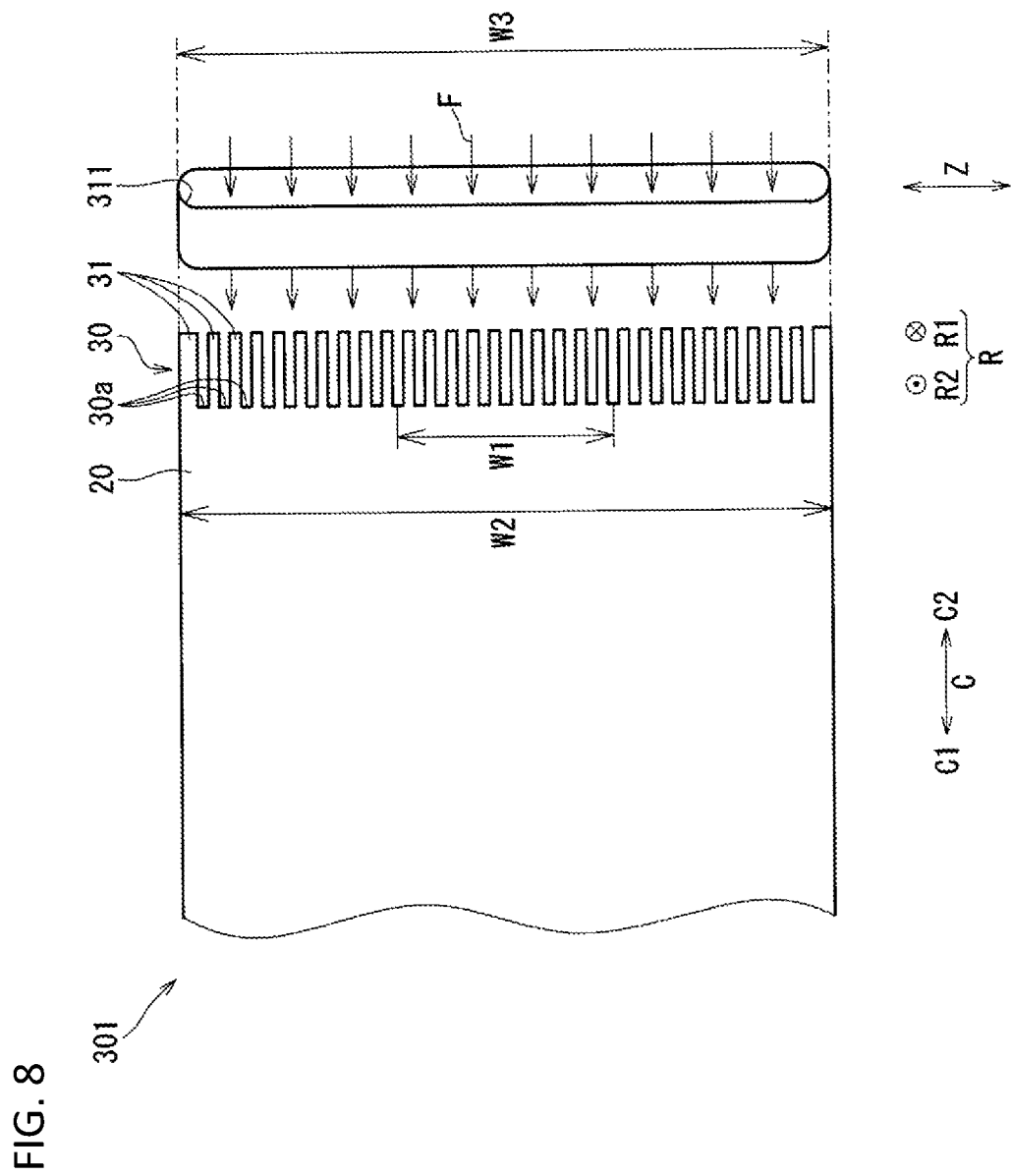
FIG. 8 is a drawing corresponding to FIG. 6 that shows a third embodiment.

Referring to FIG. 8, a tilting pad bearing 301 in the third embodiment is described in relation to a different feature from the second embodiment (refer to FIG. 6). A different feature is a shape of an oil supply port 311. The sectional shape of the oil supply port 211 in the second embodiment is circular. On the other hand, the oil supply port 311 in the third embodiment has a shape that enables a lubricant to be injected towards a wide range of a fin portion 30 (of a pad 20) in a width direction thereof. The oil supply port 311 has a slit shape that extends parallel to a longitudinal direction of the fin portion 30. A longitudinal direction of the oil supply port 311, the longitudinal direction of the fin portion 30 and the width direction of the pad 20 are equal to an axial direction Z. The oil supply port 311 is directed towards the fin portion 30 that is provided on at least a central portion of the pad 20 in the width direction thereof. A width W3 of the oil supply port 311 in the longitudinal direction is preferably larger than the width W1 of the central portion of the pad 20 in the width direction thereof (one third of an overall width W2). The width W3 of the oil supply port 311 in the longitudinal direction is more preferably equal to or larger than the overall width W2 of the pad 20. The width W3 of the oil supply port 311 in the longitudinal direction is preferably equal to or larger than an overall width (=W2) of the fin portion 30. For example, the extent of the width W3 is equal to the extent of the overall width W2. The lubricant injected from the oil supply port 311 is injected uniformly in the longitudinal direction of the oil supply port 311.

(Advantage of the Sixth invention)

An advantage provided by the tilting pad bearing 301 shown in FIG. 8 is as follows.

[Configuration 6] The fin portion 30 has the longitudinal direction. The oil supply port 311 has the slit shape that extends parallel to the longitudinal direction of the fin portion 30.

By adopting the above [Configuration 6], the oil supply port 311 can inject a lubricant towards the wide range of the fin portion 30 in the longitudinal direction. Thus, since the fin portion 30 can be cooled more, the pad 20 can be cooled more accordingly.

(Advantage of the Seventh Invention)

The width direction of the pad 20, the longitudinal direction of the fin portion 30 and the longitudinal direction of the oil supply port 311 are equal to the axial direction Z. The oil supply port 211 is directed towards the fin portion 30 that is provided on the central portion of the pad 20 in the width direction thereof.

[Configuration 7] When the width W1 of the central portion of the pad 20 in the width direction thereof is assumed to be one third of the overall width W2 of the pad 20, the width W3 of the oil supply port 311 in the longitudinal direction is larger than the width W1 of the central portion of the pad 20 in the width direction thereof.

In the above [Configuration 7], the oil supply port 311 can inject the lubricant towards the wider range of the fin portion 30 in the longitudinal direction, as compared with the case where the width W3 of the oil supply port 311 is equal to or smaller than the width W1 of the central portion of the pad 20. Thus, since the fin portion 30 can be cooled more, the pad 20 can be cooled more accordingly.

(Advantage of the Eighth Invention)

[Configuration 8] The width W3 of the oil supply port 311 in the longitudinal direction is equal to or larger than the overall width W2 of the pad 20.

In the above [Configuration 8], the oil supply port 311 can inject the lubricant towards the wider range of the fin portion 30 in the longitudinal direction, as compared with the case where the width W3 of the oil supply port 311 is smaller than the overall width W2 of the pad 20. Thus, since the fin portion 30 can be cooled more, the pad 20 can be cooled more accordingly.

Fourth Embodiment

Figure 9:
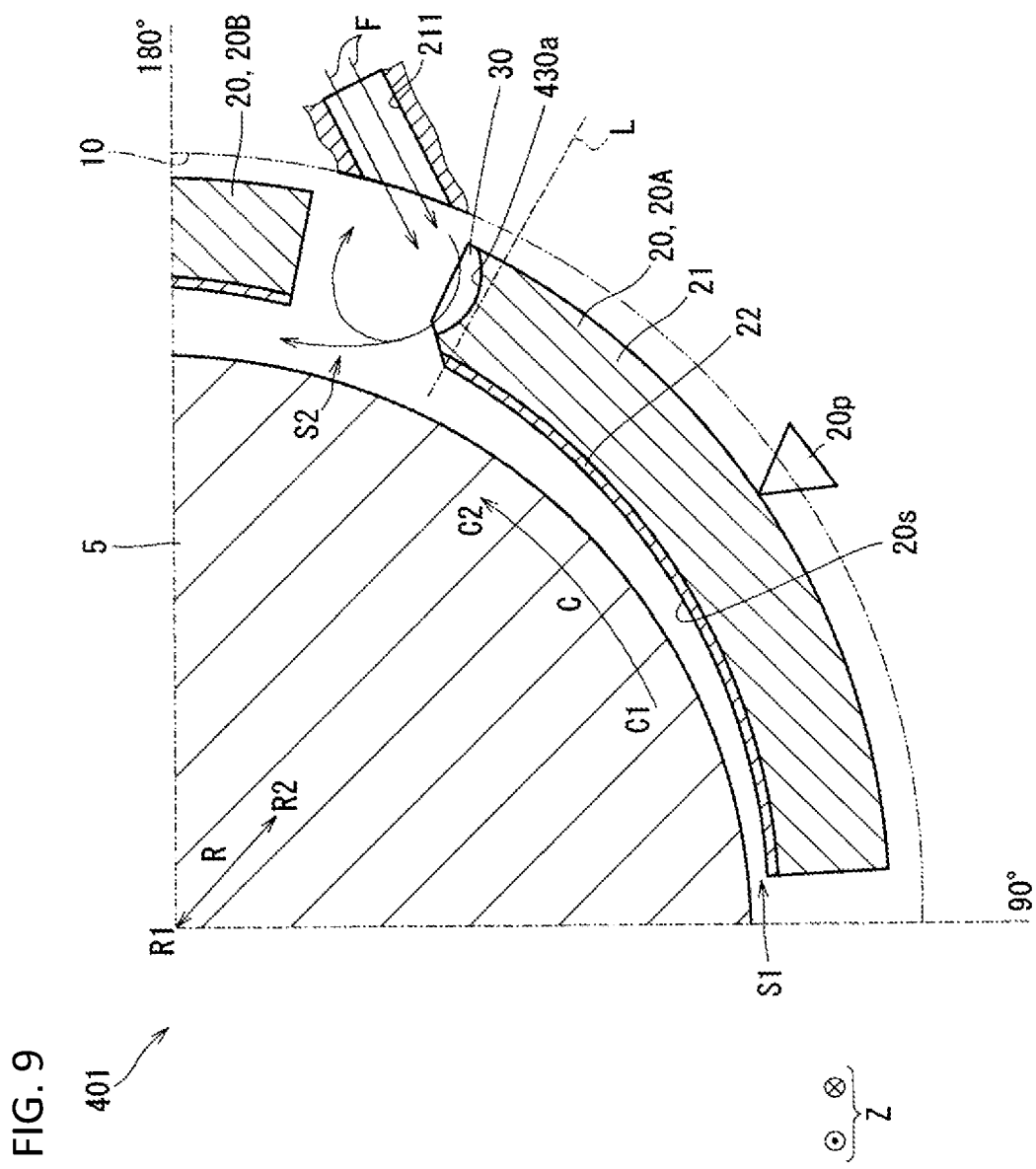
FIG. 9 is a drawing corresponding to FIG. 5 that shows a fourth embodiment.

Referring to FIG. 9, a tilting pad bearing 401 in the fourth embodiment is described in relation to a different feature from the second embodiment (refer to FIG. 5). A different feature is a shape of a bottom portion 430a of a fin portion 30. As shown in FIG. 5, in the second embodiment, the section of the bottom portion 30a when seen from the axial direction Z is the straight line that extends in the radial direction R. Hereinafter, the "section" is a section seen from the axial direction Z. On the other hand, as shown in FIG. 9, in the fourth embodiment, a section of the bottom portion 430a has a shape that promotes a convection of a lubricant and is an arc shape that curves inwardly towards an upstream side C1 in a rotation direction. The "arc shape" may be substantially an arc shape. An oil supply port 211 is directed towards the bottom portion 430a.

(Advantage of the Ninth Invention)

An advantage provided by the tilting pad bearing 401 shown in FIG. 9 is as follows.

[Configuration 9] The section of the bottom portion 430a of the fin portion 30 is the arc shape that curves inwards.

By adopting the above [Configuration 9], a lubricant is easy to convect along the bottom portion 430a. This makes it easy for heat to be transferred from the fin portion 30 to the lubricant, whereby a pad 20 can be cooled more. In addition, the lubricant is easy to convect along the bottom portion 430a, and this allows the lubricant to easily convect in an inter-pad space S2. Thus, the lubricant can be supplied more to a gap between a downstream-side pad 20B and a rotary shaft 5, whereby the downstream-side pad 20B can be cooled more.

Modified Examples

The constituent elements in the embodiments that differ from each other may be combined together. For example, the slit-shaped oil supply port 311 (refer to FIG. 8) in the third embodiment and the arc-shaped bottom portion 430a (refer to FIG. 9) in the fourth embodiment may be combined together.

A part of the constituent elements in the embodiments may not be provided. For example, in the case of the LBP shown in FIG. 1, the fin portion 30 is described as being provided on the two pads 20, however, the fin portion 30 may be provided only on one of the pads 20.

The number of constituent elements in the embodiments may be changed. For example, in the case of the LBP, the fin portion 30 may be provided on three or more pads 20. In the case of the LOP shown in FIG. 2, the fin portion 30 may be provided on two or more pads 20. The number of pads 20 is five in the embodiments, however, the number of pads 20 may be four or fewer or six or more.

The configuration (the number, position and direction) of the oil supply port 11 shown in FIG. 3 may be changed (this is also applied to the oil supply port 211 and the oil supply port 311). For example, the oil supply port 11 may be directed towards the axial direction Z. In this case, the oil supply port 11 is disposed, for example, in a position that faces the pad 20 and the axial direction Z.

The configuration of the fin portion 30 may be changed. For example, a great cooling effect can be obtained by providing the fin portion 30 in a position where the difference in temperature between the lubricant and the pad 20 is large. However, the fin portion 30 may be provided in a position where the difference in temperature between the lubricant and the pad 20 is small. The fin portion 30 is provided on the surface of the end portion of the pad 20 at the downstream side C2 in the rotation direction, however, in place of (or in addition to) this position, the fin portion 30 may be provided on the other surfaces of the pad 20 than the surface of the end portion at the downstream side C2 in the rotation direction. The fin portion 30 may be provided on at least any of a surface of an end portion of the pad 20 at the upstream side C1 in the rotation direction, a surface of an end portion at the radially outer side R2 and a surface of an end portion at an outer side in the axial direction Z.

In FIG. 4, the direction in which the fin 31 extends and the direction in which the plurality of fins 31 are aligned may be changed. In the embodiment, the direction in which the fin 31 extends is the direction perpendicular to the axial direction Z. However, the fin 31 may extends in a direction perpendicular to the radial direction R or a direction perpendicular to the rotation direction C. In the embodiment, the direction in which the fins 31 are aligned is equal to the axial direction Z. However, the fins 31 may be aligned in the radial direction R or the rotation direction C. The direction in which the fin 31 extends may be a direction that is oblique to at least any of the rotation direction C, the radial direction R and the axial direction Z (this is also applied to the direction in which the fins 31 are aligned).

As shown in FIG. 10, a bottom portion 530a of the fin portion 30 may be situated towards the upstream side C1 in the rotation direction from the imaginary line L. In this case, the fin portion 30 is provided so that a heat capacity that is good enough to cool the pad 20 as compared with the conventional pad can be ensured by the thin portion 20c.

Figure 11:
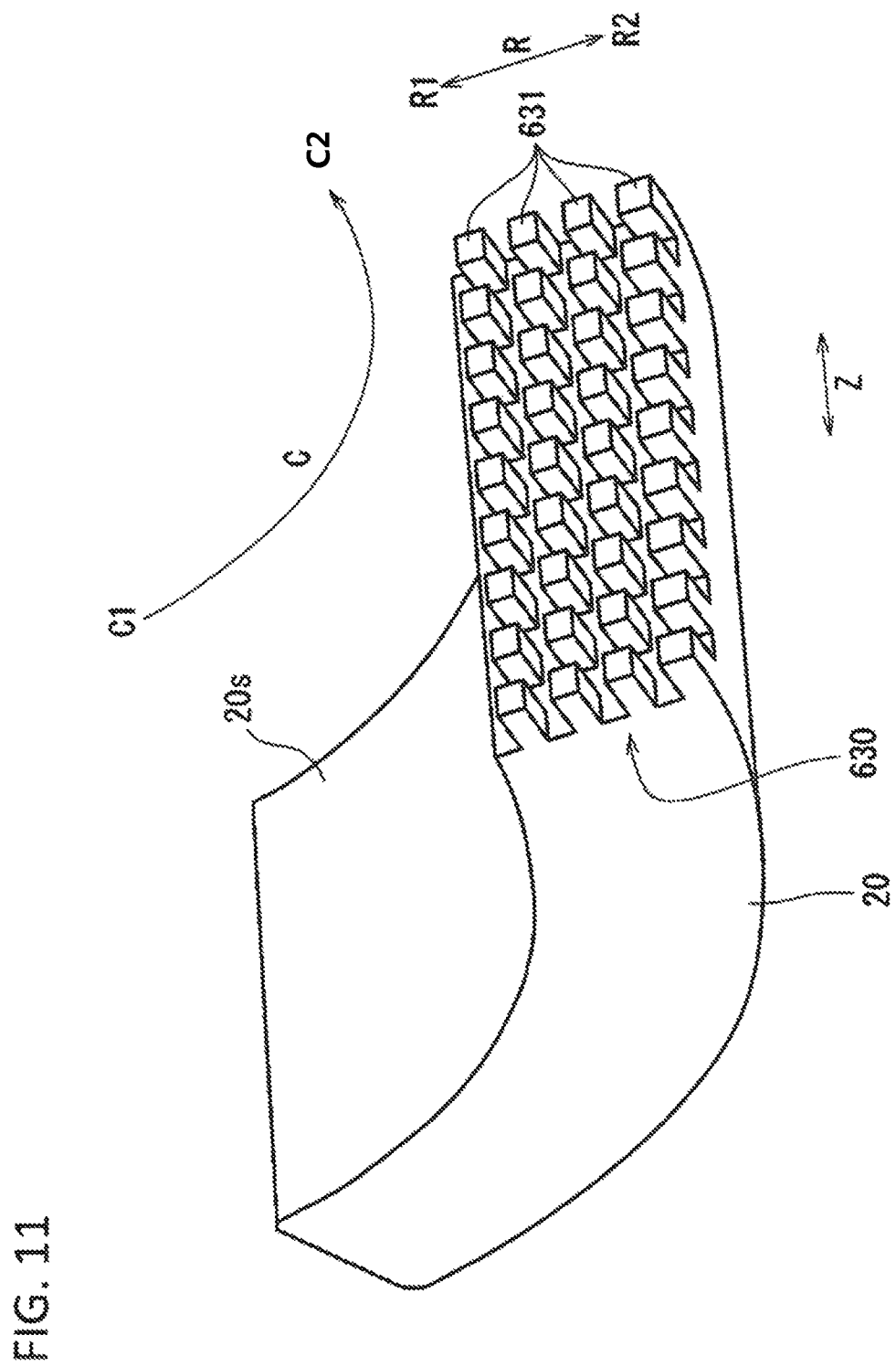
FIG. 11 is a drawing corresponding to FIG. 4 that shows a modified example.

As shown in FIG. 11, the fin portion 30 (refer to FIG. 4) may be replaced by a projecting portion 630. The projecting portion 630 has a plurality of projections 631. The projections 631 may be of a pillar shape, quadrangular prisms, circular cylinders or the like. In the case where the projections 631 are quadrangular prisms, the projections 631 can easily be fabricated as compared with the case where the projections 631 are circular cylinders. A direction in which the projection 631 extends and a direction in which the projections 631 are aligned can be set variously as with the direction in which the fin 31 (refer to FIG. 4) extends and the direction in which the fins 31 are aligned. The projections 631 may not have the pillar shape.

While the present invention has been described heretofore in detail or by reference to the specific embodiments, it is obvious to those skilled in the art to which the invention pertains that various alterations or modifications can be made thereto without departing from the spirit and scope of the invention.

This patent application is based on Japanese Patent Application No. 2016-018116 filed on Feb. 2, 2016, the contents of which are incorporated herein by reference.

INDUSTRIAL APPLICABILITY

The tilting pad journal bearing of the invention can cool the pads while ensuring the load supporting capability and the damping effect and is useful for various pumps or blowers.

DESCRIPTION OF REFERENCE NUMERALS AND SIGNS 1, 201, 301, 401: Titling pad bearing (tilting pad journal bearing)
10: Bearing housing
11, 211, 311: Oil supply port
20: Pad
20A: Upstream-side pad
20B: Downstream-side pad
20s: Pad bearing surface 30: Fin portion (projecting portion)
31: Fin (projection)
630: Projecting portion
631: Projection
C2: Downstream side in a rotation direction (downstream side in a rotation direction of a rotary shaft)
L: Imaginary line.

The invention claimed is:

1. A tilting pad journal bearing, comprising:
a bearing housing;
a plurality of pads that are arranged on an inner circumferential surface of the bearing housing and support a rotary shaft; and
a projecting portion provided on a surface of the pad and having a plurality of projections,
wherein the projecting portion is provided on a surface other than a pad bearing surface in surfaces of the pad, the pad bearing surface being a surface that faces the rotary shaft, and
a bottom portion of the projecting portion where the projecting portion is in direct contact with the pad is wider in a radial direction than a top portion of the projecting portion that is not in direct contact with the pad.

2. The tilting pad journal bearing according to claim 1, wherein the projecting portion is provided on a surface of an end portion of the pad at a downstream side in a rotation direction of the rotary shaft.

3. The tilting pad journal bearing according to claim 2, wherein when seen from an axial direction of the rotary shaft, a bottom portion of the projecting portion resides within an area that includes an imaginary line that extends from an end of the pad bearing surface at the downstream side in the rotation direction of the rotary shaft to a radially outer side of the rotary shaft along a radial direction of the rotary shaft and a portion that is situated towards the downstream side in the rotation direction of the rotary shaft from the imaginary line.

4. The tilting pad journal bearing according to claim 1, wherein the bearing housing comprises an oil supply port for supplying a lubricant into the bearing housing, and
the oil supply port is directed towards the projecting portion.

5. The tilting pad journal bearing according to claim 4, wherein a width direction of the pad is equal to an axial direction of the rotary shaft, and
the oil supply port is directed towards the projecting portion provided at a central portion in the width direction of the pad.

6. The tilting pad journal bearing according to claim 4, wherein the projecting portion has a longitudinal direction, and
the oil supply port has a slit shape that extends parallel to the longitudinal direction of the projecting portion.

7. The tilting pad journal bearing according to claim 6, wherein a width direction of the pad, the longitudinal direction of the projecting portion and a longitudinal direction of the oil supply port are equal to an axial direction of the rotary shaft,
the oil supply port is directed towards the projecting portion provided at a central portion in the width direction of the pad, and
when a width of the central portion in the width direction of the pad is assumed to be one third of an overall width of the pad, a width of the longitudinal direction of the oil supply port is larger than the width of the central portion in the width direction of the pad.

8. The tilting pad journal bearing according to claim 7, wherein the width of the longitudinal direction of the oil supply port is equal to or larger than the overall width of the pad.

9. The tilting pad journal bearing according to claim 1, wherein a section of a bottom portion of the projecting portion has an arc shape that curves inwardly.

10. The tilting pad journal bearing according to claim 1, wherein the projecting portion is provided on a surface of an end portion of the pad at the downstream side in the rotation direction of the rotary shaft, and
a height of the projecting portion from a bottom portion thereof towards the downstream side in the rotation direction of the rotary shaft is equal to or smaller than one fifth of a space between an upstream-side pad that is the pad on which the projecting portion is provided and a downstream-side pad that is disposed next to the upstream-side pad towards the downstream side in the rotation direction of the rotary shaft.

11. The tilting pad journal bearing according to claim 1, wherein the projecting portion is a fin portion having a plurality of fins that are disposed parallel to one another.

12. The tilting pad journal bearing according to claim 11, wherein the plurality of fins each extend in a radial direction of the rotary shaft and a rotation direction of the rotary shaft and are aligned in a axial direction of the rotary shaft.

13. The tilting pad journal bearing according to claim 11, wherein the bearing housing comprises an oil supply port for supplying a lubricant into the bearing housing, and
the plurality of fins each extend parallel to a supply direction of the lubricant from the oil supply port.

14. A tilting pad journal bearing, comprising:
a bearing housing;
a plurality of pads that are arranged on an inner circumferential surface of the bearing housing and support a rotary shaft; and
a projecting portion provided on a surface of the pad and having a plurality of projections,
wherein the projecting portion is provided on a surface other than a pad bearing surface in surfaces of the pad, the pad bearing surface being a surface that faces the rotary shaft, and
when seen from an axial direction of the rotary shaft, a bottom portion of the projecting portion resides within an area that includes an imaginary line that extends from an end of the pad bearing surface at the downstream side in the rotation direction of the rotary shaft to a radially outer side of the rotary shaft along a radial direction of the rotary shaft and a portion that is situated towards the downstream side in the rotation direction of the rotary shaft from the imaginary line.

15. A tilting pad journal bearing, comprising:
a bearing housing;
a plurality of pads that are arranged on an inner circumferential surface of the bearing housing and support a rotary shaft; and
a projecting portion provided on a surface of the pad and having a plurality of projections,
wherein the projecting portion is provided on a surface other than a pad bearing surface in surfaces of the pad, the pad bearing surface being a surface that faces the rotary shaft,
the bearing housing comprises an oil supply port for supplying a lubricant into the bearing housing, and the oil supply port is directed towards the projecting portion.

\* \* \* \* \*